(12) United States Patent
Scholz

(10) Patent No.: US 9,157,278 B2
(45) Date of Patent: Oct. 13, 2015

(54) APPARATUS INCLUDING LOAD DRIVEN BY A MOTOR COUPLED TO AN ALTERNATOR

(75) Inventor: Eckard Scholz, Eldingen (DE)

(73) Assignee: Baker Hughes Incorporated, Houston, TX (US)

( * ) Notice: Subject to any disclaimer, the term of this patent is extended or adjusted under 35 U.S.C. 154(b) by 722 days.

(21) Appl. No.: 13/409,918

(22) Filed: Mar. 1, 2012

(65) Prior Publication Data

US 2013/0228373 A1 Sep. 5, 2013

(51) Int. Cl.
*E21B 4/04* (2006.01)
*E21B 41/00* (2006.01)
*E21B 47/18* (2012.01)
*H02P 25/30* (2006.01)

(52) U.S. Cl.
CPC .............. *E21B 4/04* (2013.01); *E21B 41/0085* (2013.01); *E21B 47/18* (2013.01); *H02P 25/30* (2013.01)

(58) Field of Classification Search
CPC ..... E21B 4/04; E21B 34/066; E21B 41/0085; E21B 47/18; H02P 25/30
USPC .............. 166/66.4, 66.6, 250.01, 177.1, 373; 175/57, 104, 40
See application file for complete search history.

(56) References Cited

U.S. PATENT DOCUMENTS

| | | | |
|---|---|---|---|
| 4,265,305 A | 5/1981 | Stone et al. | |
| 5,258,755 A | 11/1993 | Kuckes | |
| 5,517,464 A | 5/1996 | Lerner et al. | |
| 6,092,610 A | 7/2000 | Kosmala et al. | |
| 6,419,014 B1 * | 7/2002 | Meek et al. | 166/255.2 |
| 6,714,138 B1 * | 3/2004 | Turner et al. | 340/854.3 |
| 6,745,844 B2 | 6/2004 | Henderson | |
| 6,998,724 B2 | 2/2006 | Johansen et al. | |
| 7,143,722 B2 | 12/2006 | Ross | |
| 7,234,543 B2 | 6/2007 | Schaaf | |
| 7,330,779 B2 | 2/2008 | Schulz | |
| 8,011,452 B2 | 9/2011 | Downton | |
| 8,020,624 B2 | 9/2011 | Ocalan et al. | |
| 2005/0000733 A1 | 1/2005 | Schaaf | |
| 2005/0194187 A1 | 9/2005 | Gleitman et al. | |
| 2007/0295515 A1 * | 12/2007 | Veneruso et al. | 166/386 |
| 2008/0128123 A1 | 6/2008 | Gold | |
| 2008/0156486 A1 * | 7/2008 | Ciglenec et al. | 166/264 |
| 2008/0217024 A1 | 9/2008 | Moore | |
| 2009/0321141 A1 | 12/2009 | Kotsonis et al. | |
| 2010/0089583 A1 * | 4/2010 | Xu et al. | 166/298 |
| 2010/0314173 A1 | 12/2010 | Hbaieb et al. | |
| 2011/0164999 A1 | 7/2011 | Meek | |
| 2011/0273147 A1 | 11/2011 | Hall et al. | |
| 2011/0276187 A1 | 11/2011 | Ciglenec et al. | |

FOREIGN PATENT DOCUMENTS

WO WO8002051 10/1980

OTHER PUBLICATIONS

International Search Report and Written Opinion dated Jun. 13, 2013 for International Application No. OCT/US2013/027915.

* cited by examiner

*Primary Examiner* — Jennifer H Gay
*Assistant Examiner* — David Carroll
(74) *Attorney, Agent, or Firm* — Cantor Colburn LLP

(57) ABSTRACT

An apparatus for use in a wellbore is described. The apparatus includes a load, a motor coupled to the load to provide mechanical power to the load and an alternator directly coupled to the motor driving the motor. The apparatus further includes a switch between the alternator and the motor that in a first position connects the alternator to the motor in a first configuration that rotates the motor in the clockwise direction and in a second configuration that rotates the motor in the counterclockwise direction.

21 Claims, 3 Drawing Sheets

APPARATUS INCLUDING LOAD DRIVEN BY A MOTOR COUPLED TO AN ALTERNATOR

BACKGROUND

1. Field of the Disclosure

This disclosure relates generally to downhole loads operated by directly coupled alternator motor units.

2. Background of the Art

Wellbores for production of hydrocarbons are drilled using a drill string that includes a drilling assembly (also referred to as a "bottomhole assembly") attached to a bottom end of a tubular. A drill bit is attached to the bottom end of the BHA. The drill bit is rotated by rotating the drill string and/or by a mud motor in the BHA to drill the wellbore. The BHA may include various devices that are operated by electrical motors. The wellbore temperature can exceed 200 degrees. At high temperatures, the effort on the electronic side of the electrical motors is very high to control the speed and the position of a motor drive. However it is not always necessary to precisely control the speed and/or position of the motor drive.

The disclosure herein provides apparatus having a power unit that includes an electrical motor driven by a substantially directly coupled alternator that includes relatively minimal or no electronics.

SUMMARY

In one aspect, an apparatus for use in a wellbore is provided that in one embodiment includes a load, a motor coupled to the load to provide electrical power to the load and an alternator directly coupled to the motor driving the motor. In one aspect, the apparatus further includes a switch between the alternator and the motor that in a first position connects the alternator to the motor in a first configuration that rotates the motor in the clockwise direction and in a second configuration that rotates the motor in the counterclockwise direction.

In another aspect, a method for operating a device is provided that in one embodiment includes providing the device to be operated, coupling an electrical motor to the device to operate the device, and providing electrical power to the motor from an alternator directly coupled to the motor. A switch may be provided between the alternator and the motor to enable the motor to rotate in the clockwise and anticlockwise directions.

The disclosure provides examples of various features of the apparatus and methods disclosed herein that are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

The disclosure herein is best understood with reference to the accompanying figures in which like numerals have generally been assigned to like elements and in which.

DETAILED DESCRIPTION OF THE EMBODIMENTS

Figure 1:
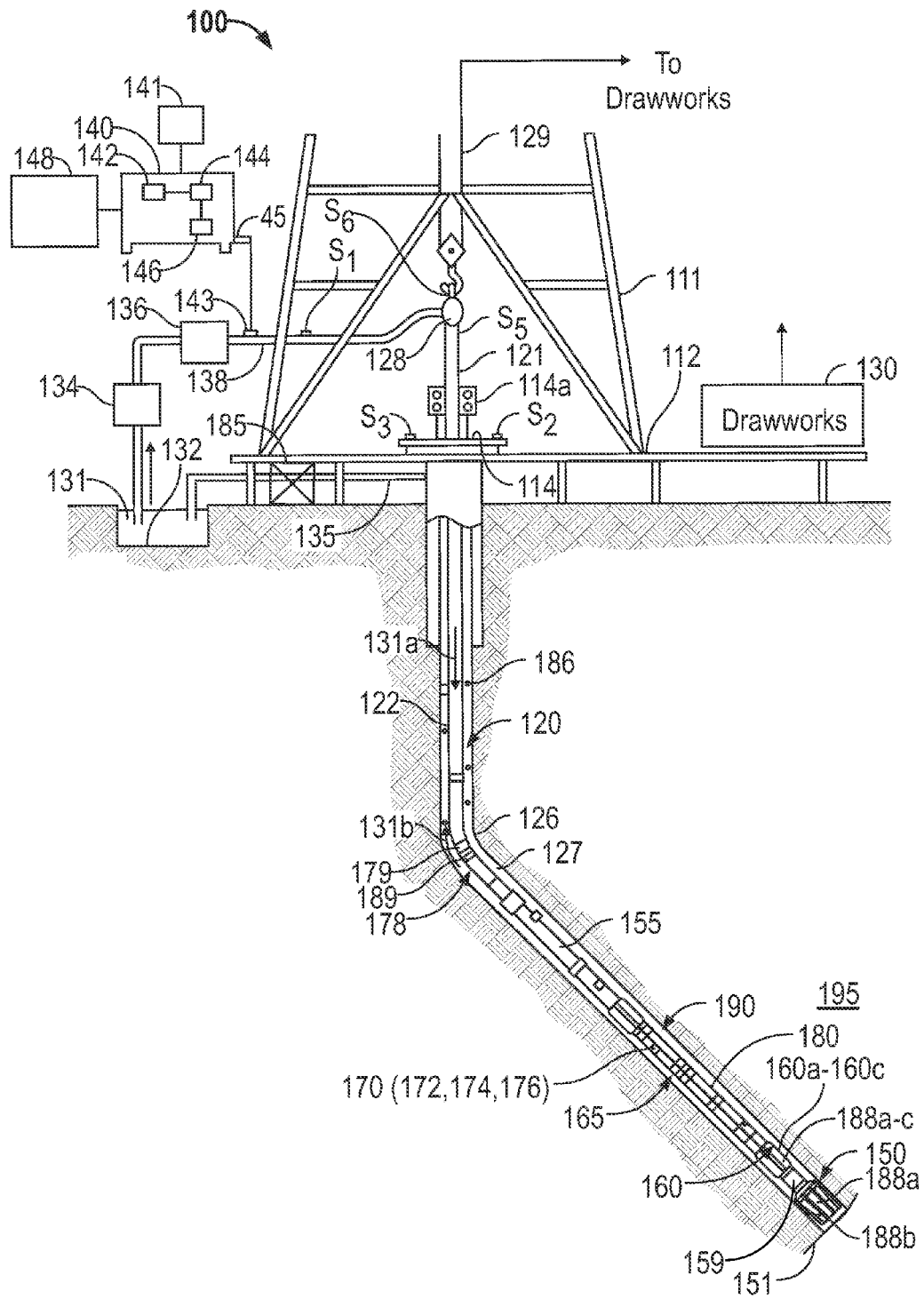
FIG. 1 is an elevation view of a drilling system including energy conversion devices, according to an embodiment of the present disclosure.

FIG. 1 is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottomhole assembly ("BHA") 190 conveyed in a borehole 126. The drilling system 100 includes a conventional derrick 111 erected on a platform or floor 112 that supports a rotary table 114 that is rotated by a prime mover, such as an electric motor (not shown), at a desired rotational speed. A tubing (such as jointed drill pipe) 122, having the drilling assembly 190 attached at its bottom end, extends from the surface to the bottom 151 of the borehole 126. A drill bit 150, attached to drilling assembly 190, disintegrates the geological formations when it is rotated to drill the borehole 126. The drill string 120 is coupled to a draw works 130 via a Kelly joint 121, swivel 128 and line 129 through a pulley. Draw works 130 is operated to control the weight on bit ("WOB"). The drill string 120 may also be rotated by a top drive (not shown) rather than the prime mover and the rotary table 114. The operation of the draw works 130 is known in the art and is thus not described in detail herein.

In an aspect, a suitable drilling fluid 131 (also referred to as "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 provide information about the torque and the rotational speed of the drill string 120. Rate of penetration of the drill string 120 may be determined from the sensor $S_5$, while the sensor $S_6$ may provide the hook load of the drill string 120.

In some applications, the drill bit 150 is rotated by rotating the drill pipe 122. However, in other applications, a downhole motor 155 (mud motor) disposed in the drilling assembly 190 also rotates the drill bit 150. The rate of penetration ("ROP") for a given drill bit and BHA largely depends on the WOB or the thrust force on the drill bit 150 and its rotational speed.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided by a program to the surface control unit 140. The surface control unit 140 displays desired drilling parameters and other information on a display/monitor 142 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole and may control one or more operations of the downhole and surface devices.

The drilling assembly 190 may also contain formation evaluation sensors or devices (also referred to as measurement-while-drilling, "MWD," or logging-while-drilling, "LWD," sensors) determining resistivity, density, porosity, permeability, acoustic properties, nuclear-magnetic resonance properties, corrosive properties of the fluids or formation downhole, salt or saline content, and other selected properties of the formation 195 surrounding the drilling assembly 190. Such sensors are generally known in the art and for convenience are generally denoted herein by numeral 165. The drilling assembly 190 may further include a variety of other sensors and communication devices 159 for controlling and/or determining one or more functions and properties of the drilling assembly (such as velocity, vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc. A controller 170 in the drilling assembly 190 may be provided to control various downhole operations and process sensor data. The controller may include a processor, such as a microprocessor 172, a data storage device 174, such as a solid-state memory, and programmed instructions 176.

Still referring to FIG. 1, the drill string 120 further includes energy conversion device and a telemetry device 178. Energy conversion device 178 is located in the drill string 120 tubular and provides power to the various devices and sensors in the drilling assembly. In the drilling assembly 190, a number of devices may utilize electric motors to operate such devices (each such device also is referred to herein as a "load"). Such devices include, but are not limited to: a telemetry device that uses a poppet-type valve or an oscillating valve for generating pressure pulses, wherein the motor drives a spindle or turns a spindle to open and close the valve; and a motor that drives a pump that provides a fluid under pressure to a force application member to cause the drill bit to turn toward a selected direction. In high temperature wellbores, the burden on the electronics is very high to control the speed and the position of the motor. The disclosure herein provides motors driven by alternators with minimal or no electrical circuits for driving the loads. For example, a power unit 189 containing a motor according an embodiment of this disclosure may be used to drive the telemetry unit 178. Similarly separate motors 188a-188c made according to an embodiment of this disclosure may drive hydraulic pumps used for supplying fluid to pistons to drive the force application members 160a-160c. Exemplary loads driven by an alternator-motor combination made according to an embodiment of this disclosure are described in reference to FIGS. 2 and 3.

Figure 2:
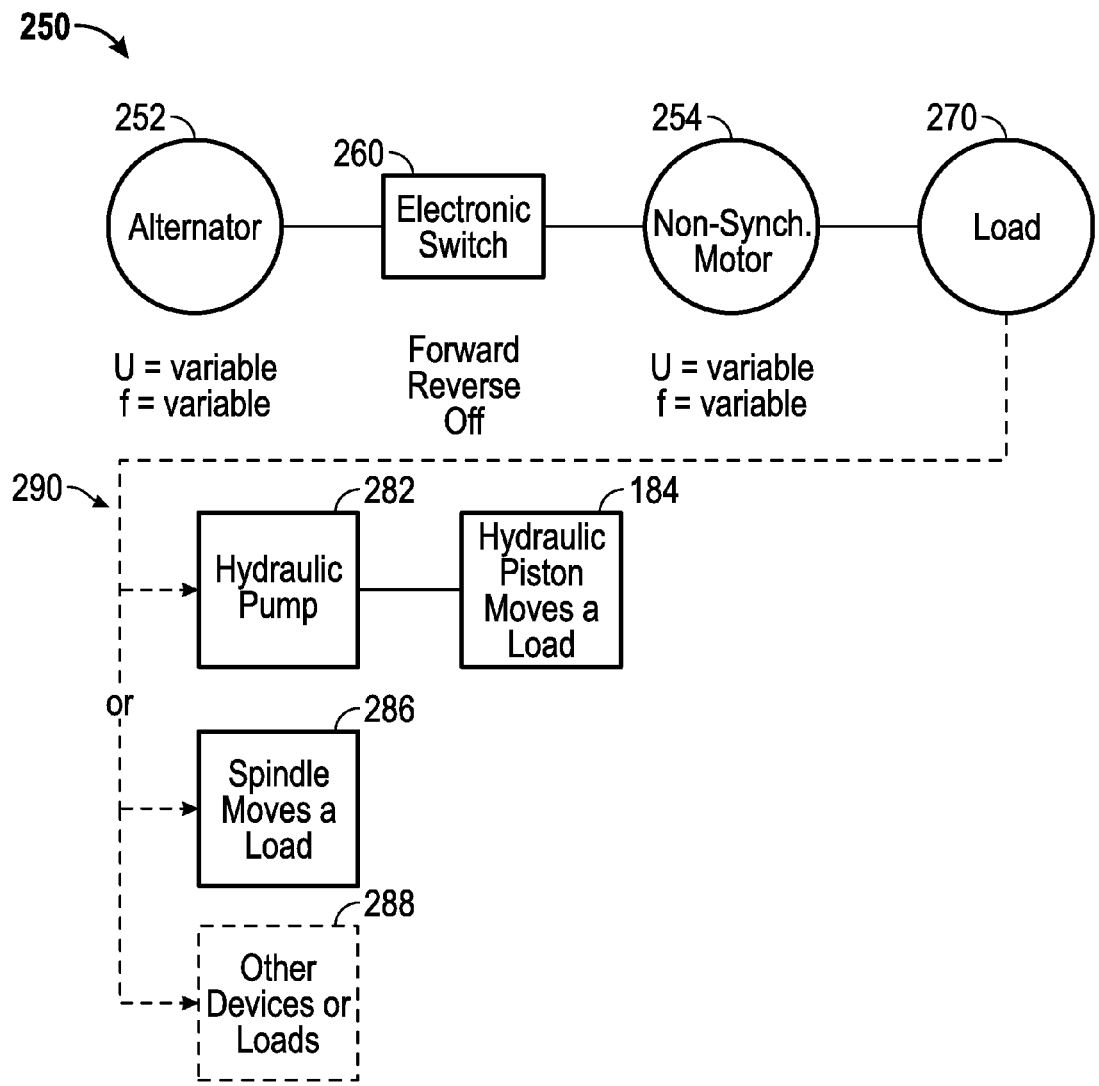
FIG. 2 is block diagram showing a motor directly coupled to an alternator driving a load, according to an embodiment of the disclosure.

FIG. 2 is a block diagram showing a power device 250 that includes an alternator-motor combination made according to one embodiment of the disclosure for driving exemplary loads 290 in a drilling assembly. The device 250 includes an alternator 252 that provides electrical power to an electric motor 254. The motor 254 drives a load 270. In one embodiment, the motor 254 is an asynchronous motor. An asynchronous motor has the operating characteristic that when the motor is: not driving a load, it operates at a first higher rotational speed and a first torque; and when it is driving the load, it operates at a second lower rotational speed and a second torque. In one embodiment, as shown in FIG. 2, the alternator 252 is connected to the motor 254 via an electronic switch 260. In another embodiment, the alternator 252 may be directly connected to the motor 254.

Figure 3:
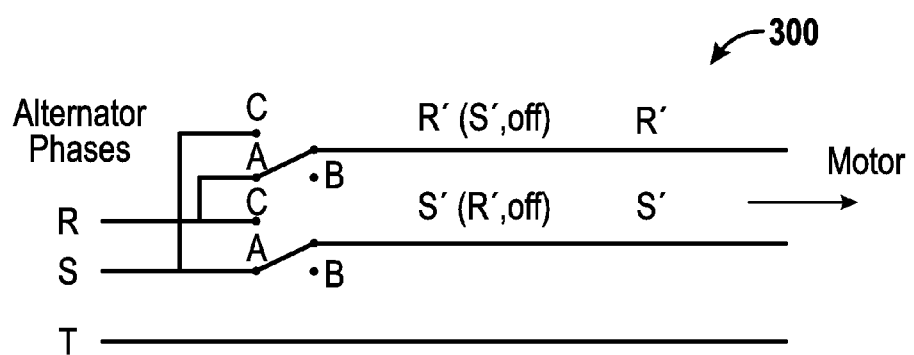
FIG. 3 is an exemplary switch for turning on and off the motor shown in FIG. 2.

FIG. 3 shows an exemplary switch 300 for use in the device 250. Switch 300 includes operating positions A, B, and C and three electrical conductors or lines R, S, T connected to the phases of the alternator 254 (FIG. 2) (also referred to herein as the "input side") and three conductors or lines R', S' and T to the phases of motor 254 (also referred to as the "output side." When the switch 300 is in position A, line R of a first phase of the alternator connects to a line R' of the motor 254 first phase and line S of the second phase of the alternator 252 connects to line S' of the motor second phase. In this configuration, the motor 254 rotates in a first direction, for example clockwise. When the switch 300 is in position B, the alternator 252 is disconnected from the motor 254. When the switch 300 is in position C, line R of the first phase of the alternator connects to a line S' of the motor 254 second phase and line S of the second phase of the alternator 252 connects to line R' of the motor first phase. In this configuration, the motor 254 rotates in a second direction (opposite to the first direction), i.e., counterclockwise.

Referring back to FIG. 2, the load 270 may be any suitable device. For example, the load may be a hydraulic device, such as a hydraulic pump 282 that supplies a fluid under pressure to a piston 284 that moves a device or member, such as a force application member 160a-160c described in reference to FIG. 1. The load 270 may be a mechanical device, such as a spindle 286 that drives or operate a device, such as a valve. Other loads 288 may be operated by the motor 254. An example of a spindle-type device operated by the motor 270 is described in reference to FIG. 4.

Figure 4:
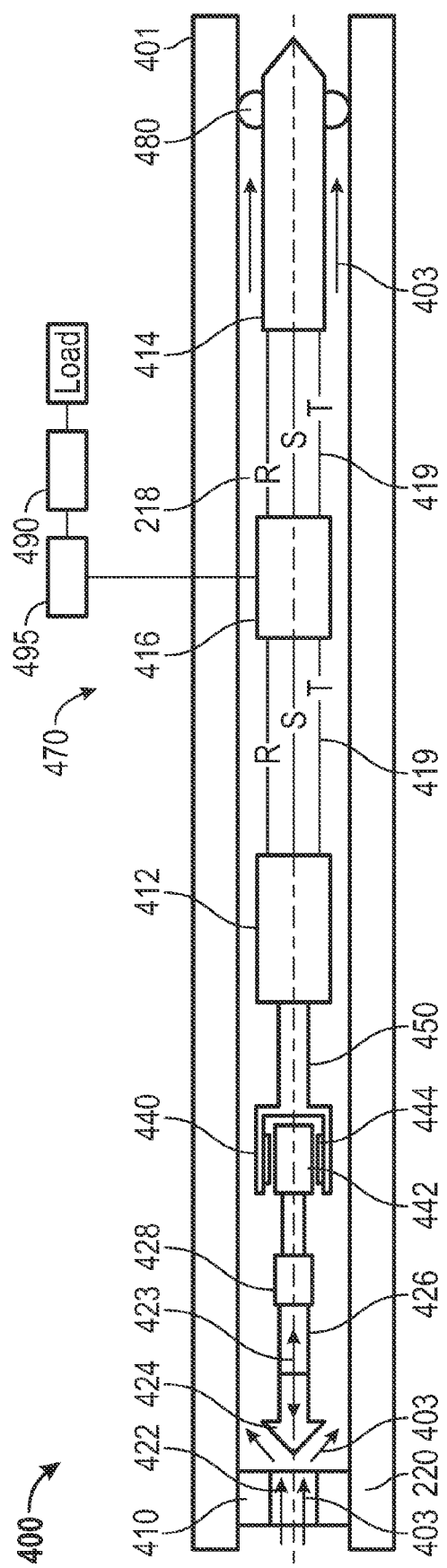
FIG. 4 is a line diagram of an exemplary downhole device driven by the motor shown in FIG. 2.

FIG. 4 shows a device 400 that includes a fluid driven valve 410 operated by a power device 470 made according to an embodiment of the disclosure. The device 400 is shown placed in a drill collar 401 of a bottom hole assembly, such as a the bottomhole assembly 190 shown in FIG. 1. The valve 410 includes an opening 422 through which a drilling fluid 403 flows. The valve 405 further includes a poppet or cone 424 that moves back and forth, as shown by arrows 423. The valve 410 is closed and opened by blocking and unblocking the flow of the fluid 403 through the opening 422 of the valve 410. The cone 424 is connected to an end of a spindle 426. A motor 412 turns a screw member 450 (drive member) that drives a spindle drive 428 that drives the cone 424 back and forth. A clutch 440 may be connected between the motor 412 and the spindle drive 428 to selectively engage the drive member 450 to and disengage the drive member 450 from the spindle drive 428. In an embodiment, the clutch 440 may be a slipping clutch, such as a hysteresis clutch that includes a permanent magnet section 442 and a hysteresis material 444. The slipping clutch could be implemented in addition to another clutch that is selectively engaged. An alternator 414 provides electrical power to the motor 412 via a switch 416 as shown and described in reference to FIGS. 2 and 3. Wires 419 connect the alternator and motor phases as described in reference to FIG. 3. In aspects, the alternator 414 may be driven by a turbine 480 driven by the drilling fluid 403 flowing through the valve 410. To close the valve 410, the switch 416 is placed in a first position, such as position A shown in FIG. 3, to cause the motor 412 to turn in a first direction to move the member 450 forward (toward the fluid opening 422). The cone 424 moves forward and blocks, at least partially, the fluid 403 from passing through the opening 422, thereby producing a pressure pulse. To open the valve 410, the switch 416 is placed in a second position, such as position C shown in FIG. 3. This causes the motor 412 to reverse the rotational direction, causing the spindle 426 to move backward, i.e., away from the fluid opening. The reverse movement could be caused by the force of the drilling fluid alone when the motor is shut off. In one embodiment, the motor 412 may be directly connected to the spindle drive, wherein the switch 416 is configured to toggle at selected time intervals to cause the valve to open and close at a selected frequency. In another embodiment, the switch may be controlled by circuit in response to programmed instruction or in response to a parameter, such as a parameter relating to the load or another event. The end position of the valve cone may be determined from the force of the drilling fluid or from the turns of the motor as that relates to the linear motion of the rod 450. In another aspect, If the alternator and motor combination is used to drive a hydraulic pump to move a piston to drive a force application member, the switch may be moved to the on, off or neutral position based on the force applied by the force application member or the linear motion of the piston. An appropriate sensor 490, such a linear motion sensor, force sensor and the like may be coupled to the load for providing measurement relating to the selected parameter. The sensor measurements may be processed by a controller 495. The controller 495 also may be configured to operate the switch 416 in response to the parameter measured by the sensor 490.

The alternator-motor combination disclosed herein can operate over a wide speed range of the alternator. In aspects, the alternator may be a three phase brushless permanent magnet alternator. The alternator is connected via a relatively simple electronics with a three phase motor, which may be an asynchronous motor or a synchronous permanent magnet motor. In aspects, the electronics may merely include a switching device when the EMF (ElectroMotive Force) of the alternator is adjusted or matched to the EMF of the Motor. In this configuration, the following operating conditions are possible: (1) off; (2) forward; and (3) backward, especially when an asynchronous or induction motor is used. In one aspect, the end position of the drive may be a mechanical stop, in which case the motor can still be powered in this position. The alternator and the motor can be designed so that they will not burn in this position. Also, a slipping clutch can prevent the alternator and the motor from getting overloaded.

The foregoing disclosure is directed to certain embodiments. Various changes and modifications to such embodiments will be apparent to those skilled in the art. It is intended that all changes and modifications that are within the scope and spirit of the appended claims be embraced by the disclosure herein.

The invention claimed is:

1. An apparatus for use in a wellbore, comprising:
   a load;
   a motor coupled to the load to provide mechanical energy to the load;
   a switch directly coupled to the motor; and
   an alternator directly coupled to the switch and no other electrical circuits, the switch configured to selectively connect phases of the alternator to phases of the motor and the alternator configured to drive the motor with a first configuration of the switch that causes the motor to rotate in a clockwise direction and with a second configuration of the switch that causes the motor to turn in a counterclockwise direction.

2. The apparatus of claim 1 further comprising a clutch between the load and the motor configured to couple and uncouple the motor to the load in response to occurrence of an event.

3. The apparatus of claim 2, wherein the event includes a member of the load coming to mechanical stop or a force applied by the member of the load reaching a selected value.

4. The apparatus of claim 1, further comprising a sensor configured to provide measurements relating to a selected parameter of the load and a controller configured to control operation of the switch in response to the selected parameter.

5. The apparatus of claim 1, wherein the load includes a member that moves linearly to open and close the valve and wherein the motor moves the member back and forth to open and close the valve.

6. The apparatus of claim 1, wherein the load includes a pump configured to supply a fluid under pressure to a member and wherein the motor operates the pump.

7. The apparatus of claim 1, wherein the alternator is operated by a hydraulically-operated device.

8. A method of operating a device, comprising:
   providing the device;
   coupling a motor to the device to operate the device;
   connecting a switch directly to the motor; and
   providing electrical power to the motor from an alternator directly coupled to the switch and no other electrical circuits, wherein the switch selectively connects phases of the alternator to phases of the motor, and the switch, in a first position, connects the alternator to the motor to provide electrical power to rotate the motor in clockwise direction and, in a second position, provides power to the motor to rotate in anticlockwise direction.

9. The method of claim 8 further comprising providing a clutch between the device and the motor that couples and uncouples the motor to the device in response to occurrence of an event.

10. The method of claim 9, wherein the event is a member of the device coming to mechanical stop or a force applied by the member of the device reaching a selected value.

11. The method of claim 8, further comprising proving a sensor configured to provide measurements relating to a selected parameter of the device and a controller configured to control an operation of the switch in response to the selected parameter.

12. The method of claim 8, wherein the device includes a member that moves linearly to open and close a valve and wherein the motor moves the member back and forth to open and close the valve.

13. The method of claim 8, wherein the device includes a pump configured to supply a fluid under pressure to a member and wherein the motor operates the pump.

14. The method of claim 8, wherein the alternator is operated by a hydraulically-operated device.

15. A drilling system including a drilling assembly having an electrically-driven load, comprising:
   a motor coupled to the load to provide mechanical energy to the load;
   an alternator directly coupled to a switch and no other electrical circuits and coupled, through the switch, to the motor, the alternator driving the motor; and
   the switch directly coupled to both the alternator and the motor to selectively connect phases of the alternator to the phases of the motor in two configurations to rotate the motor in two respective directions.

16. The drilling system of claim 15, wherein the load is one of: a hydraulic unit; and a mechanical unit.

17. The drilling system of claim 16 further comprising a clutch between the load and the motor configured to couple and decouple the motor to the load in response to occurrence of an event.

18. The drilling system of claim 17, wherein the event occurs when a member of the load comes to a mechanical stop or when a force applied by a member of the load reaches a selected value.

19. The drilling system of claim 15 further comprising a sensor configured to provide measurements relating to a selected parameter of the load and a controller configured to control operation of the switch in response to the selected parameter.

20. The drilling system of claim 15, wherein the load includes a member that moves linearly to open and close the valve and wherein the motor moves the member back and forth to open and close the valve.

21. The drilling system of claim 15, wherein the motor is selected from a group consisting of: a linear induction motor; and a linear synchronous motor.

* * * * *